United States Patent [19]

Berkstresser et al.

[11] Patent Number: 4,807,241
[45] Date of Patent: Feb. 21, 1989

[54] ELECTRON BEAM PUMPED LASER

[75] Inventors: George W. Berkstresser, Bridgewater; Joseph Shmulovich, Murray Hill, both of N.J.

[73] Assignee: American Telephone and Telegraph Company AT&T Bell Laboratories, Murray Hill, N.J.

[21] Appl. No.: 71,850

[22] Filed: Jul. 10, 1987

Related U.S. Application Data

[62] Division of Ser. No. 749,928, Jun. 28, 1985.

[51] Int. Cl.$^4$ .............................................. H01S 3/091
[52] U.S. Cl. ........................................ 372/80; 372/24; 372/40; 372/74
[58] Field of Search ............. 372/74, 24, 6, 80, 39–41, 372/69, 70, 73

[56] References Cited

U.S. PATENT DOCUMENTS

| | | | |
|---|---|---|---|
| 2,996,634 | 8/1961 | Woodcock | 313/475 |
| 3,027,219 | 3/1962 | Bradley | 346/110 R |
| 3,349,339 | 10/1967 | Thorington | 372/80 |
| 3,409,901 | 11/1968 | Dost et al. | 346/161 |
| 3,493,886 | 2/1970 | Coffee | 372/80 |
| 3,611,179 | 10/1971 | Fyler | 372/6 |
| 3,731,225 | 5/1973 | Wild et al. | 372/80 |
| 4,459,512 | 7/1984 | Ohhata | 313/468 |
| 4,550,256 | 10/1985 | Berkstresser et al. | 25 D/483.1 |
| 4,695,762 | 9/1987 | Berkstresser et al. | 313/475 |

OTHER PUBLICATIONS

Burrus et al; "Single Crystal Fiber . . . Fiber Laser"; Appl. Phys. Letters, vol. 26, No. 6, Mar. 15, 1975; pp. 318–320.

Stone et al; "Nd:$Y_2O_3$... Wavelength"; J. Appl. Phys. 49(4); Apr. 1978; pp. 2281–2287.

Robertson et al; "Thin Single . . . Liquid Phase Epitaxy"; Philips J. Res. 35, 354–371, 1980 (No. 6).

Brown et al; "Improved . . . Cathode Ray Tube"; IBM Technical Disclosure Bulletin; vol. 24, No. 4, 09/1981; 2019–2020.

Primary Examiner—William L. Sikes
Assistant Examiner—Xuan T. Vo
Attorney, Agent, or Firm—Michael J. Urbano

[57] ABSTRACT

The luminescent screen of a cathode ray tube includes an array of monocrystalline or amorphous phosphor rod-like elements which are covered with a reflective coating except for one end of each element which serves as an output face. The phenomenon of the light trapping is advantageously exploited to achieve enhanced brightness. The screen is illuminated with an electron beam which has an essentially oblong cross section and which is oriented along the elongated dimension of the elements. In one embodiment the elements comprise epitaxial $Lu_3Al_3Ga_2O_{12}$:Ce on the top of a YAG substrate, and a light absorbing layer of $Lu_3Al_{3.5}Fe_{1.5}O_{12}$ is formed on the bottom of the substrate. A printer utilizing such a CRT is described. Also described is a configuration in which each of the rod-like elements functions as a laser.

6 Claims, 4 Drawing Sheets

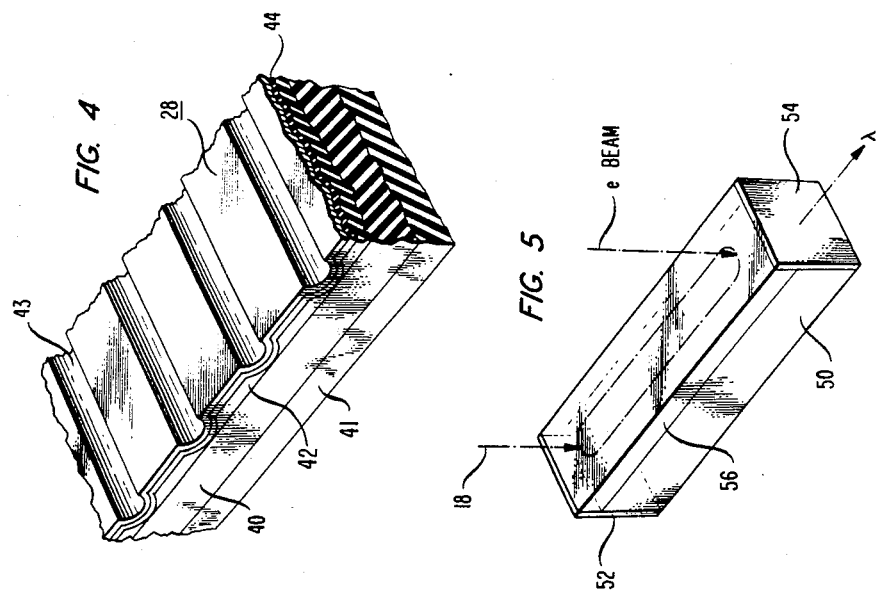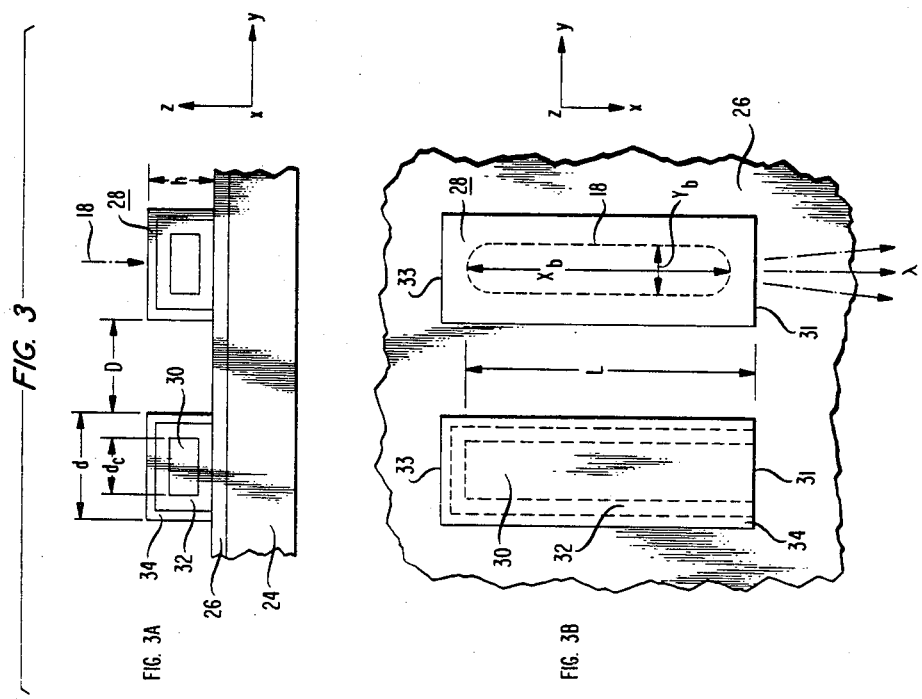

ELECTRON BEAM PUMPED LASER

This is a division of application Ser. No. 749,928, filed June 28, 1985, which is a continuation-in-part of application Ser. No. 555,167, now abandoned.

BACKGROUND OF THE INVENTION

This invention relates to cathode ray tubes and, more particularly, to luminescent screens for use in such tubes.

The most common cathode ray tubes utilize a powdered phosphor on a carrier as a luminescent screen. These screens have relatively low thermal loadability since heat is insufficiently dissipated from the phosphor grains. As a consequence, during high brightness operation the phosphor has low quantum efficiency and may even be severely damaged. In addition, powdered phosphors exhibit coulomb degradation; that is, quantum efficiency declines due to electron bombardment. This problem is particularly acute in high brightness applications when high electron beam current is used (e.g., in projection CRT applications).

A partial solution to this problem is described in British patent application G.B. No. 2,000,173A which proposes that the luminescent screen be fabricated from a self-supporting monocrystalline body which includes a luminescent layer containing at least one activator. This screen purports to reduce diffuse reflections and increase heat dissipation, thus improving resolution and thermal loadability. Garnet crystal structures with Tb, Tm, Eu, Ce or Nd activators are said to be preferred.

The single crystal nature of the screen, however, gives rise to light trapping inside the monocrystalline layer which has a relatively high refractice index relative to its surroundings. This trapping phenomenon reduces the brightness which would otherwise be obtainable from the screen. However, the brightness obtainable from any luminescent screen, whether a single crystal or powdered material is used, is limited by power saturation of the phosphor; that is, beyond the saturation point, additional increases in electron beam power density do not yield significantly increased brightness. In addition, in certain cases the practical limit to achievable brightness is caused by heating of the phosphor, or by the inability to focus a high current electron beam to the desired spot size. In many applications (e.g., projection CRT), that practically achievable brightness level is insufficient.

One approach to enhancing brightness and phosphor lifetime is to make the luminescent screen (faceplate) as a series of phosphor bars, A. V. Brown et al, *IBM Technical Disclosure Bulletin*, Vol. 24, No. 4, pp. 2019–2020 (1981). Each bar is made to act as a light guide by suitable choice of the refractive index of the phosphor and the dielectric film supporting the bars. No reflective coating is formed on the other surfaces of the bars. A short region in the middle of the guide is created to spoil the light-guiding action of the bar, for example, by a bevel or by scattering centers. A rectangular shaped electron beam is scanned across the bars with its long side parallel to the length of the bars. Thus, a fraction of the light in each pumped bar will be guided to the center of the bar and a small light source will be created at the spoiling region in the middle. The direction of light emission, however, is primarily transverse to the length of the bar, not parallel to it. In this way, the authors claim that a very bright but small light spot is obtained from a large area of phosphor irradiated by a large area electron beam.

Unfortunately, light coupling efficiency from such a spoiling region is relatively poor which militates against the advantage of using bars pumped by rectangular e-beams. In addition, optical devices, such as microlenses, to enhance output coupling in such structures are extremely difficult to fabricate at each spoiling region.

SUMMARY OF THE INVENTION

In one aspect of our invention, however, light trapping within a phosphor layer is exploited advantageously in a luminescent screen with enhanced brightness. In accordance with one embodiment of the invention, a cathode ray tube includes means for generating a scannable electron beam and a luminescent screen including a monocrystalline or amorphous phosphor layer on which the electron beam is made incident to generate a scannable spot of light, characterized in that the phosphor layer comprises an array of elongated rod-like elements each having at one end an output face from which light escapes, a reflective coating covers other surfaces of the element, and the generating means provides an electron beam with an oblong cross section which is made incident along the length of selected ones of the elements. Thus, the primary direction of light emission is parallel to the length of the rods which simplifies the output coupling optics.

The elements may be rectangular parallelepipeds, circular cylinders, or elongated trapezoidal bodies, but in each case the optical axes of the elements are essentially parallel to one another.

In this scheme, the resolution is determined by the cross-sectional dimensions of each rod-like element and is not limited by the power of the electron beam or by photon scattering effects. Importantly, for a given pixel (i.e., output face of an element) much higher electron beam power can be deposited into an element without experiencing the adverse effects of power saturation, thermal loading, and beam focusing. The reflective coating improves the efficiency with which the generated light is guided to the output face. Hence, much higher brightness for a given resolution can be attained.

In currently preferred embodiments of the invention, the rod-like elements comprise single crystal phosphor material having the composition $(Y_{3-x-y}R_xLu_y)(Al_{5-w}Ga_w)O_{12}$, where R is chosen from the lanthanide rare earth elements (other than Lu and Y). R is preferably chosen from Ce, Eu, Tb, and most preferably is Ce. In the above expression, $0<x<0.3$, $1.5<w<2.5$, with $y=1.4w\pm0.4w$. The last condition is intended to mean that y is in the range between about $y=w$ and about $y=1.8w$, preferably $y=1.4w$. In especially advantageous embodiments, the phosphor has a composition $(Lu_{3-x}Ce_x)(Al_{5-w}Ga_w)O_{12}$, with $0.01<x<0.03$, and $1.8<w<2.2$. Preferably w is about 2.

It is frequently advantageous to provide emitters according to the invention with a light absorbing layer. Such a layer can reduce or eliminate propagation and scattering of unguided light if it contains a constituent that absorbs in the spectral range in which phosphor emission takes place. For emitters that use $Y_3Al_5O_{12}$ substrates, an advantageous absorbing layer composition is $Lu_3(Al_{5-w}Fe_w)O_{12}$, with $0<w<2.0$. Although in general an absorbing layer could be interposed between the rod-like elements and the substrate, it is currently considered more advantageous to place the absorbing layer on the substrate surface that is opposite the surface which carries the emitter elements. In the latter case, the absorbing layer should have a refractive index that is equal to or slightly greater than that of the substrate material to reduce Fresnel reflections.

In an alternative embodiment of the invention, opposite ends of rod-like elements of a laser active medium are provided with mirrors, and each element functions as a laser. This configuration may utilize direct electron beam pumping or optical pumping of the active medium. In the latter case, a conversion layer is interposed between the electron beam and the active medium. The conversion layer absorbs the electron beam and as a result emits light which is effective to pump the active medium.

BRIEF DESCRIPTION OF THE DRAWING

The invention, together with its various features and advantages, can be readily understood from the following, more detailed description taken in conjunction with the accompanying drawing, in which the figures are not drawn to scale in the interest of clarity.

FIGS. 3A and 3B are end and top views, respectively, of two of the rods of FIG. 2;

FIG. 4 is an isometric view of an alternative embodiment of the invention in which rod-like emitters are formed by etching a monocrystalline phosphor layer;

FIG. 5 is an isometric view of a laser element in accordance with yet another embodiment of the invention;

DETAILED DESCRIPTION

Figure 1:
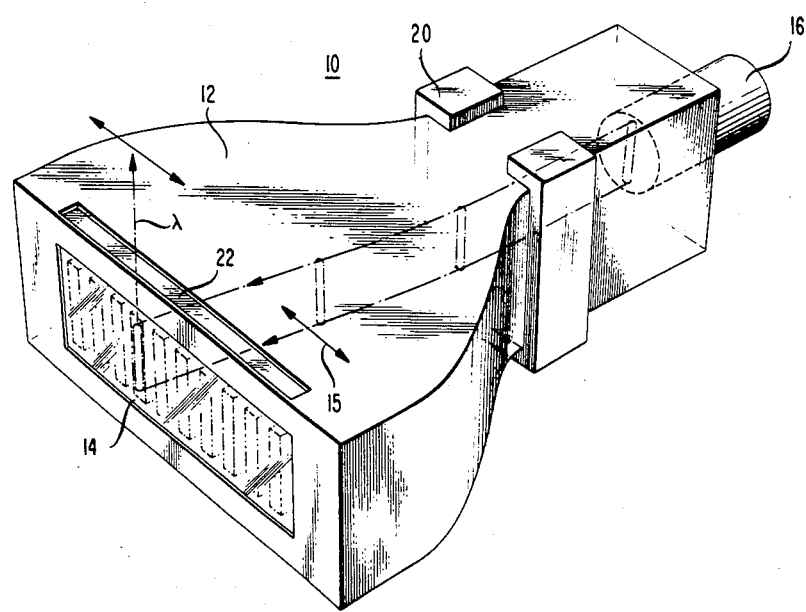
FIG. 1 is a schematic, isometric view of a cathode ray tube in accordance with one embodiment of the invention.

With reference now to FIG. 1, there is shown schematically a cathode ray tube 10 which includes an enclosure 12 for maintaining a vacuum, a luminescent screen 14 mounted at one end of the enclosure 12, and an electron gun 16 mounted at the opposite end of the enclosure 12. The electron gun 16 provides an electron beam 18 which has an essentially oblong cross section. The term oblong as used herein includes, without limitation, rectangular, elliptical and oval. The beam 18 is deflected under the control of deflection means 20 so as to scan the luminescent screen 14 in the direction of arrow 15. As the electron beam scans, it is absorbed in the screen 14 causing the emission of a scanning spot of light λ which emanates from the enclosure 12, illustratively through a transparent window 22. Because the primary direction of the light emission is parallel to the rods, the light output can be extracted from enclosure 12 directly through window 22 without the need for complicated optical arrangements. On the other hand, suitable optics (not shown, but well known in the art) external to enclosure 12 may be used to couple the scanning spot of light to an observer station or display screen, for example. The directions of the electron beam and the light emission are generally transverse to one another because the luminescent screen 14 includes an array of essentially parallel, elongated rod-like light emitter elements (e.g., parallelepipeds) which extend transverse to the electron beam direction.

Figure 2:
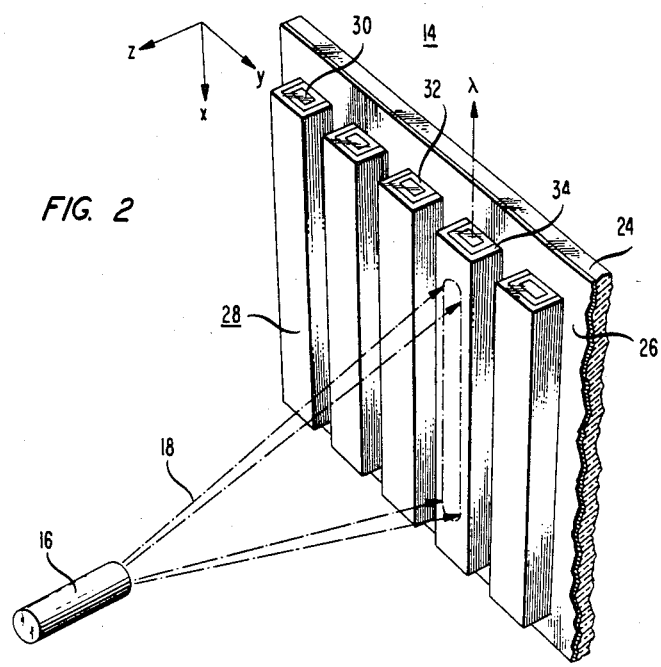
FIG. 2 is a schematic, isometric view of the luminescent screen of the cathode ray tube of FIG. 1.

These rod-like elements 28 are shown with more particularity in FIGS. 2 and 3. Each element includes a core 30 of monocrystalline or amorphous phosphor material surrounded by a reflective coating, illustratively a composite of a dielectric layer 32 and a metallic layer 34. The phosphor material is generally transparent; i.e., it exhibits low light scattering and low absorption at the wavelength of the emitted light. Each element 28 is mounted on a carrier, e.g., on a metal layer 26 which is formed on a major surface of a substrate 24. One end 31 of each rod-like element 28 is an output face through which the light λ emerges, whereas the opposite end 33 and the other four faces are covered by the reflective coating described above, which improves the efficiency with which the generated light is guided to the output face.

As shown in FIG. 3B, the electron beam 18 is directed generally transverse (not necessarily at 90°) to the x-y plane. The cross section of the beam is generally oblong having a major axis $x_b$ and a minor axis $y_b$, with the major axis extending along the length or elongated dimension (x-axis) of the rod-like element 28.

In accordance with the invention, the phenomenon of light trapping is advantageously exploited in order to enhance the brightness of the luminescent screen 14. The basic idea is that the isolated rod-like elements 28 produce light through a small cross section in the z-y plane (FIG. 3A) but have a relatively large x dimension (e.g., length L of core 30 as seen in FIG. 3B). Because the area of the core in the x-y plane is relatively large, the electron beam 18 can deposit a relatively large total power input without creating unduly high power densities and without requiring that the core width $d_c$ be large. The resolution of the array is determined by the width d and height h of the element 28. Note the thicknesses of the layers 32 and 34 are typically small enough that $d \approx d_c$ (the layer thicknesses are not drawn to scale).

Figure 8:
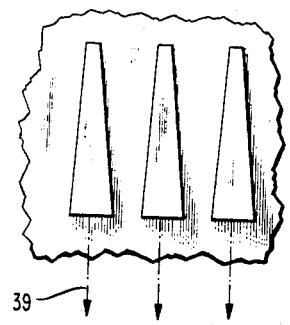
FIG. 8 is a top view of tapered or trapezoidal elements in accordance with yet another embodiment of the invention.

Provided that the refractive index of the core 30 is greater than that of the dielectric layer 32, the light generated in the core by the electron beam will be trapped in the element 28. Any light ray reaching the interface between the core and dielectric layer at an angle greater than the critical angle will undergo total internal reflection. On the other hand, light rays reaching that interface at smaller angles will be partially transmitted through the dielectric layer and thus will be reflected from the metal layer 34. Although the trapped light builds up within the core, it is allowed to escape through the output face 31, which may be roughed or polished depending on the application. In addition, the output face may be shaped to enhance light output coupling. Alternatively, the rods may be tapered as shown in FIG. 8 so as to have trapezoidal cross sections facing the beam. However, the optical axes 39 of the elements are still essentially parallel to one another.

In general, the cross section of the electron beam resembles the shape of the element 28 in the x-y plane. Much higher total powers can be deposited into such an element than into the pixel of a conventional CRT without significantly degrading resolution. Since there is freedom in choosing the major axis dimension $x_b$ of the electron beam, the length L of the core 30 can be made very long to accommodate high power, high brightness operation. Illustratively, the rato of L:d may be 100:1 and D:d may be 2:5. Corresponding dimensions are illustratively d=50 μm, D=20 μm, and L=5 mm, so that 1000 elements could be formed on a target measuring 70 mm by 5 mm.

Illustratively, the core comprises one or more monocrystalline phosphor layers depending upon whether single color or multiple color operation is desired. The choice of material depends upon system parameters such as scan rate in relation to activator parameters such as radiative lifetime. Illustratively, the core material is monocrystalline $Y_3Al_5O_{12}$ (YAG) doped with suitable activators such as Ce, Tm or Eu for light emission at green, blue or red wavelengths, respectively. Alternatively, the monocrystalline phosphor may comprise YAG:Bi for operation in the blue or YAG:Bi and Cr for operation in the red as described by G. W. Berkstresser and T. D. Huo in copending application Ser. No. 629,084 filed on July 9, 1984, now abandoned, and assigned to the assignee hereof. On the other hand, the monocrystalline material may comprise YAG:Ce and Tb for operation at 4800–7000 Angstroms as described by G. W. Berkstresser, T. D. Huo and J. Shmulovich in copending application Ser. No 542,391 filed on Oct. 17, 1983 and also assigned to the assignee hereof.

Alternatively, because of the advantages provided by my invention, for many applications the core may comprise a lower efficiency amorphous (e.g., glass-like) material such as the alkaline earth aluminosilicates described by R. F. Reade in U.S. Pat. No. 3,962,117 issued on June 8, 1976. For example, sample 18 of that patent comprises approximately 54.5% $SiO_2$, 30.8% $Al_2O_3$, 12.1% MgO, 2.2% $ZrO_2$, where the percentages are by weight on the oxide basis. The glass has a peak wavelength at 6050 Angstroms.

Which materials are used to fabricate the reflective coating depends upon the material of the core 30. For a YAG core a suitable dielectric 32 comprises $Al_2O_3$ or $MgF_2$ and a suitable metal layer 34 comprises Al or Ag. Alternatively, the composite reflective coating may be replaced with a single layer of, for example, indium-tin oxide (ITO) in applications utilizing guiding by total internal reflection (e.g., FIG. 4). For the alkaline earth aluminosilicates, on the other hand, a suitable dielectric layer 32 comprises $SiO_2$ and a suitable metal layer 34 comprises Al.

In order to achieve multi-color operation, the core 30 may include three layers or regions of phosphor material with different activators, one each to provide the primary colors, red, blue, and green. Illustratively, the three layers may be etched or otherwise fabricated in a staircase configuration. The three layers may be optically coupled to one another so that regardless of which layer is excited the light always emerges from the same output face, or the three layers may be optically isolated so that light emerges only from the output face on the end of the layer excited. One electron gun for all colors or a gun for each color can be used.

In an alternative embodiment as shown in FIG. 4, each of the rod-like elements 28 is fabricated by growing epitaxially a layer 42 of monocrystalline core material on a monocrystalline substrate 40. The materials are illustratively garnets, but the layer 42 has a higher refractive index and thus will tend to trap light therein when covered by a suitable reflection coating 44. The layer 42 is etched by any well-known technique to form parallel grooves 43 which define the rod-like elements as mesas therebetween. Crosstalk between the elements is reduced by an absorbing layer 41 on the bottom of the substrate 40.

As was stated above, in some currently preferred embodiments, the rod-like elements comprise epitaxial phosphor material of the composition $(Y_{3-x-y}R_xLu_y)(Al_{5-w}Ga_w)O_{12}$, with R selected from the lanthanide rare earth elements, preferably Ce, Eu or Tb, and $0 < x < 0.3$ (preferably $x < 0.03$ for Ce), $y = 1.4w \pm 0.4w$, and $1.5 < w < 2.5$ (preferably $1.8 < w < 2.2$).

It is known that the substitution of Ga for Al in YAG results in an increase of the refractive index, together with an increase of the lattice constant. It is also known that the incorporation of a small ion such as Lu can compensate for the increase in lattice constant due to Ga. However, the prior art suggests that the addition of Ga will result in a substantial degradation of the CL efficiency of a single crystal phosphor. For instance, it has been reported (Robertson, et al., *Phillips Journal of Research*, Vol. 36, pp. 15–30 (1981) that single crystal phosphors of the composition $(Lu_{3-x}Ce_x)(Al_{4.3}Ga_{0.7})O_{12}$ have substantially lower efficiency than their Ga-free analogs.

We have discovered that, contrary to expectation, single crystal phosphor materials within the above-disclosed compositional range can have CL efficiency comparable to that of their Ga-free analogs. Since these Ga-containing phosphors can be grown epitaxially on a YAG substrate and can have a refractive index that is greater than that of YAG, within the disclosed compositional range they can advantageously be used in luminescent screens according to the invention. In view of the above prior art teachings we consider our discovery, that the efficiency of phosphors within the disclosed compositional range is not substantially degraded compared to their Ga-free analogs in the system $(Y_{3-x}R_x)Al_5O_{12}$, to be an unexpected and surprising result.

Although any method capable of producing single crystal material of the disclosed composition that is epitaxial with a YAG substrate is contemplated by us, a convenient method, and indeed the one currently considered most suitable, is Liquid Phase Epitaxy (LPE). LPE has reached a high degree of development, and those skilled in the art of crystal growth are generally familiar with the technique. LPE has been applied to the growth of single crystal phosphor layers. See, for instance, J. M. Robertson, et al., *Phillips Journal of Research*, Vol. 35, pp. 354–371 (1981).

Illustratively, the substrate 40 comprises single crystal YAG which has a refractive index of about 1.84, the core layer 42 comprises epitaxial $Lu_3Al_3Ga_2O_{12}$:Ce which has a refractive index of about 1.88 and emits light at about 5200 Å, and absorbing layer 41 comprises epitaxial $Lu_3Al_{3.5}Fe_{1.5}O_{12}$ which has a refractive index of about 2.00. Examples of the fabrication of such materials and their use in phosphor targets follows.

EXAMPLE 1

A single crystal phosphor target was produced as follows: a melt consisting of $Y_2O_3$, $Lu_2O_3$, $CeO_2$, $Al_2O_3$, $Ga_2O_3$, PbO, and $B_2O_3$ (4.109, 7.250, 1.767, 6.149, 9.535, 1000.0, and 25.680 grams, respectively) was prepared in a Pt crucible in air at ambient pressure. The starting materials were commercial grade of typically 99.999% purity. Standard LPE growth technique (melt temperature 1024° C., growth rate 1.12 μm/min, with substrate rotation at 60 rpm, rotation reversal after each revolution) produced a 4.26 μm thick epitaxial single crystal layer on a 1.5 inch diameter, [111] oriented, 0.020 inch thick YAG substrate. The composition of the layer was approximately $Y_{1.935}Ce_{0.015}Lu_{1.05}Al_{4.25}Ga_{0.75}O_{12}$.

An array of rod-like elements was defined, using a standard lithographic technique and a mask consisting of 10 μm lines on a 110 μm centers. After etching the phosphor in a known solution the etched surface was coated with 6400 Å of $SiO_2$ and 1200 Å of Al by known techniques. The wafer was cut normal to the etched lines in 0.080 inch wide strips, the cut surfaces polished, the array strip mounted on a $1\times1\times0.080$ inch BeO ceramic plate and sealed off in a CRT.

EXAMPLE 2 On a 0.020 inch thick, 1.5 inch diameter, [111] oriented YAG disk an epitaxial 46 μm thick absorbing layer of approximately composition $Lu_3Al_{3.25}Fe_{1.75}O_{12}$ was grown by LPE from a melt containing $Lu_2O_3$, $Al_2O_3$, $Fe_2O_3$, PbO, and $B_2O_3$ (11.250, 7.612, 67.700, 1000.0, and 25.610 grams, respectively). The melt temperature was 910° C., and the growth rate was 3.05 μm/min. Growth was carried out in 3 steps, each of about 5 minute duration. The procedure resulted in growth of absorbing material on both wafer surfaces. The absorbing materia was removed from one of the surfaces by polishing.

Subsequent to removal of the Fe-doped layer, an epitaxial phosphor layer was grown by LPE on the absorber-free YAG surface from a melt containing $Lu_2O_3$, CeO, $Al_2O_3$, $Ga_2O_3$, PbO, and $B_2O_3$ (11.540, 2.500, 9.430, 32.200, 1000., and 25.650 grams, respectively), by a procedure substantially as described in Example 1. The growth temperature was 1046° C., the growth rate 3.24 μm/min, and the layer thickness 8.09 μm. The phosphor composition was approximately $Lu_{2.985}Ce_{0.015}Al_{2.9}Ga_{2.1}O_{12}$. Parallel emission elements were prepared and the target prepared and mounted, all substantially as described in Example 1.

In another configuration, the elements 28 may comprise segments of optical fiber cut to the desired length and prepared with an appropriate reflection coating as described above. Single crystal fibers of YAG and $Y_2O_3$ doped with rare earth elements are known in the art as described, for example, in articles by J. Stone et al, *Journal of Applied Physics*, Vol. 49, No. 4, p. 2287 (1978) or C. A. Burrus et al, *Applied Physics Letters*, Vol. 26, No. 6, p. 318 (1975).

Figure 6:
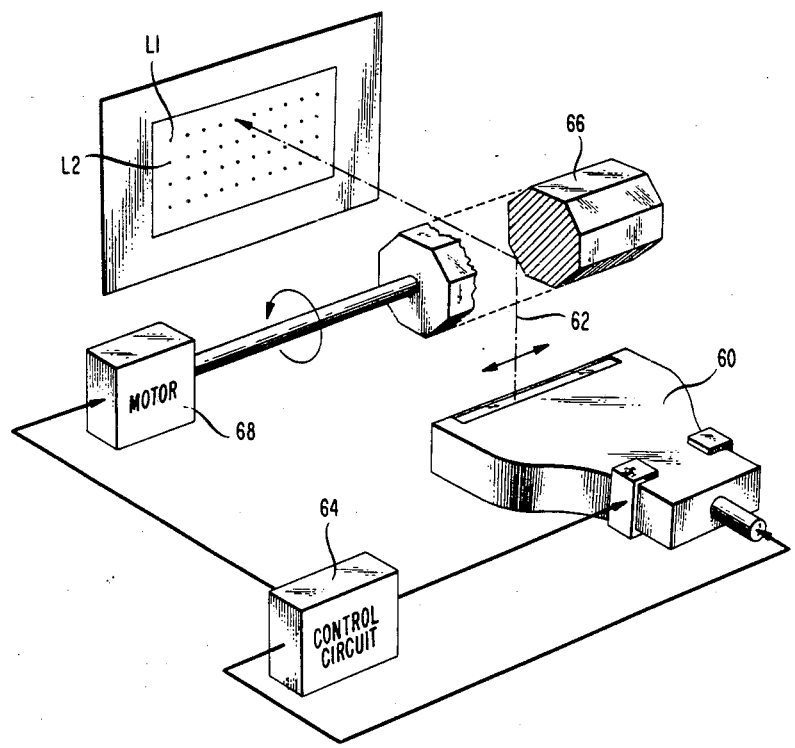
FIG. 6 is an isometric view of an arrangement for achieving two-dimensional scanning in accordance with still another embodiment of the invention.

As mentioned previously, the invention may be employed as a line scanner or may be used to effect two-dimensional scanning by incorporating a rotating mirror to deflect the beam in an orthogonal direction. One such arrangement is shown schematically in FIG. 6. A CRT 60 in accordance with the invention provides a horizontally scannable light beam 62 under the control of circuit 64. A rotatable polygon 66 deflects beam 62 so that vertical scanning of the light beam 62 is also achieved. Motor 68 rotates polygon 66 and may also be controlled by circuit 64. As a result, the light beam can be made to scan a screen, page or other surface in raster fashion, i.e., first along line L1 and, upon deflection by mirror 66, along line L2, etc. In this way, information may be displayed on the screen, or written onto the surface being scanned. Other deflection means (e.g., an acousto-optic deflector, a mirror, a prism or a combination thereof) may be used in place of polygon 66.

Figure 7:
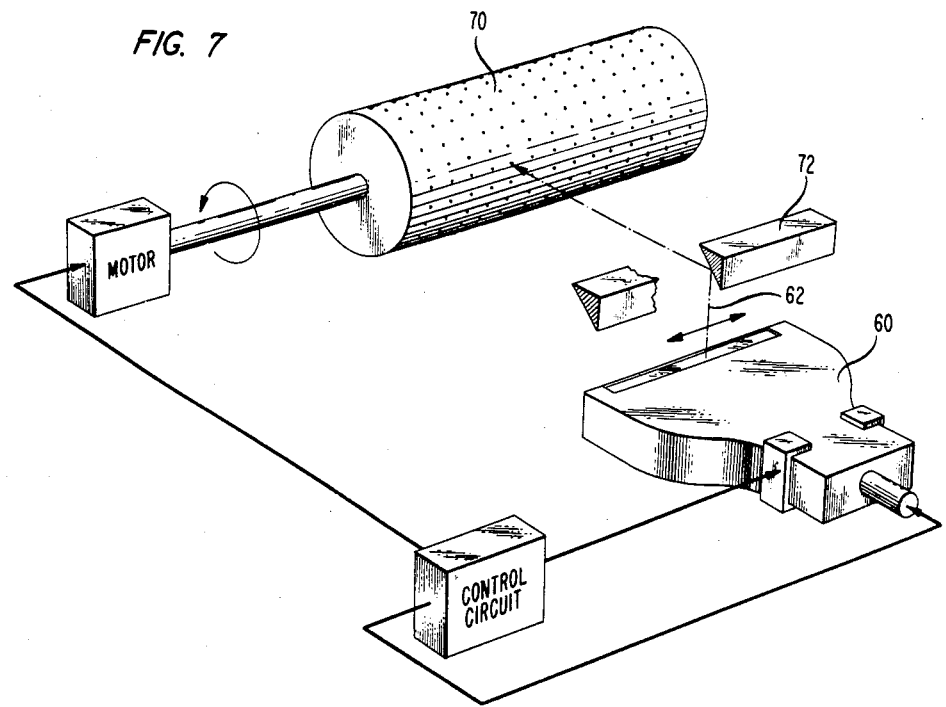
FIG. 7 is an isometric view of a printer in accordance with another embodiment of the invention.

Alternatively, where the surface being scanned is itself movable, deflection means to effect vertical scanning is not necessary. For example, as shown in FIG. 7, horizontal scanning is provided by CRT 60 as before, but vertical scanning is supplied by the rotation of drum 70. Rotation of the drum and scanning the beam are synchronized by control circuit 64. A similar arrangement could be used to scan a tape which translates vertically. Of course, in these latter schemes, the mirror 72 is a matter of convenience only; i.e., the CRT could be oriented so that the beam 62 is directly incident on the drum or tape. Moreover, a mirror or other optical arrangement could be incorporated within the CRT envelope so that light beam is essentially orthogonal to the front face of the CRT. In either case, the cylindrical surface of the drum may be covered with a photosensitive material so that the scanning light beam 62 effects a printing function.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, each of the rod-like elements may include a laser active medium 50 as shown in FIG. 5. Opposite end faces of the element are provided with mirrors 52 and 54 so as to form an optical cavity resonator. Illustratively, the active medium 50 comprises a single crystal phosphor material which may be excited directly by the electron beam 18 or indirectly via a conversion layer 56 which is optically coupled to the active medium 50; e.g., it is formed on at least one surface of the active medium 50. In the indirect pumping case, the conversion layer 56 absorbs the electron beam and generates optical radiation which, in turn, is absorbed in the active medium 50, thereby causing it to emit stimulated emission in a fashion well known in the art. Both types of laser elements may be used singly or in an array. The indirect pumping scheme can be used successfully to attain higher laser output power compared to that available using direct electron beam excitation because of the larger volume which can be excited. This is particularly true when the lasing species of medium 50 has a longer lifetime than the pumping species of layer 56. In the case of a monocrystalline YAG:Cr and Nd active medium 50, the conversion layer 56 illustratively comprises YAG:Ce.

What is claimed is:
1. Optical apparatus comprising
    an elongated element including a laser active medium and a conversion layer optically coupled to said medium,
    said active medium comprising $(Y_{3-x-y}R_xLu_y)(Al_{5-w}Ga_w)O_{12}$, with R chosen from the group consisting of the lanthanide rare earth elements other than Lu and Y, and $0<x<0.3$, $1.5<w<2.5$, and $y=1.4w\pm0.4w$.
    means forming an optical resonator including said element therein, and
    means for generating an electron beam having an essentially oblong cross section which is made incident along the elongated dimension of said element,
    said electron beam being absorbed in said conversion layer so as to generate optical radiation which is absorbed in said active medium, thereby to produce stimulated emission from said active medium.
2. The apparatus of claim 1 wherein said element has the shape of a rod and said resonator forming means includes a pair of parallel mirrors formed on opposite ends of said rod.

3. The apparatus of claim 2 including a plurality of said elements arranged parallel to one another and wherein said generating means includes means for scanning said electron beam across selected ones of said elements, thereby to produce a scanning spot of light.

4. Optical apparatus comprising
an elongated element including a laser active medium and a conversion layer optically coupled to said medium,
said active medium comprising $Y_3Al_5O_{12}$ doped with Nd and Cr and said conversion layer comprising $Y_3Al_5O_{12}$ doped with Ce,
means forming an optical resonator including said element therein, and
means for generating an electron beam having an essentially oblong cross section which is made incident along the elongated dimension of said element,
said electron beam being absorbed in said conversion layer so as to generate optical radiation which is absorbed in said active medium, thereby to produce stimulated emission from said active medium.

5. The apparatus of claim 4 wherein said element has the shape of a rod and said resonator forming means inclues a pair of parallel mirrors formed on opposite ends of said rod.

6. The apparatus of claim 5 including a plurality of said elements arranged parallel to one another and wherein said generating means includes means for scanning said electron beam across selected ones of said elements, thereby to produce a scanning spot of light.

* * * * *